INVENTORS
Robert E. King
Rollin Douglas Rumsey

ATTORNEYS

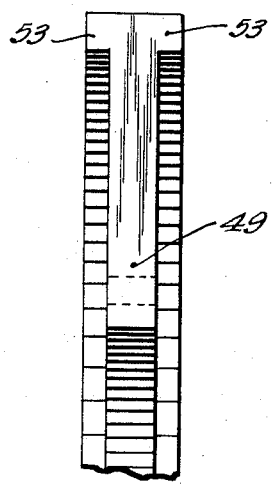
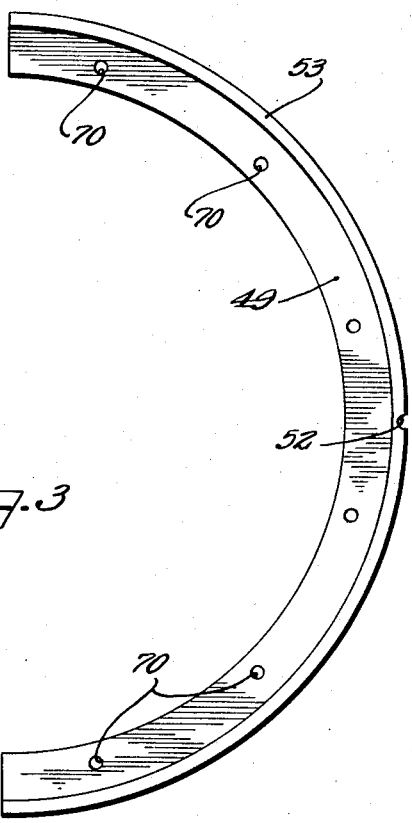
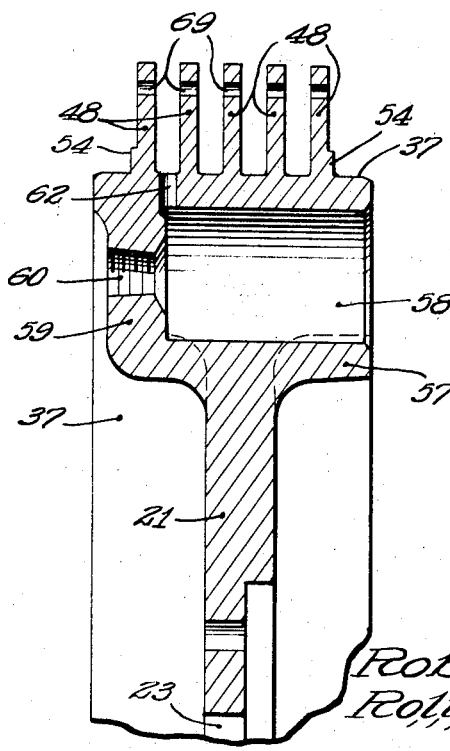
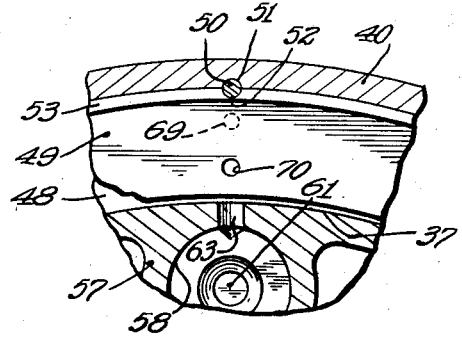

United States Patent Office 3,424,406
Patented Jan. 28, 1969

3,424,406
SHIMMY DAMPER FOR AIRCRAFT DUAL NOSEWHEELS
Rollin Douglas Rumsey, Buffalo, and Robert E. King, Orchard Park, N.Y., assignors to Houdaille Industries, Inc., Buffalo, N.Y., a corporation of Michigan
Filed Nov. 4, 1966, Ser. No. 592,074
U.S. Cl. 244—103    12 Claims
Int. Cl. B64c 25/58

ABSTRACT OF THE DISCLOSURE

A shimmy damper assembly is constructed as a fully bench-assembled unit having a first member which is mounted on the end portion of a shaft corotative with one of the wheels and has yieldably coupled therewith a second member which as an incident to axially inward mounting of the wheels and has yieldably coupled therewith a second outwardly projecting portions of fasteners on the outer side of the wheel for corotation therewith.

---

This invention relates to shimmy dampers especially useful with aircraft dual nosewheel steering assemblies of the type including a vertically operative strut rotatably mounting a pair of wheels for joint and relative rotation. More particularly, the invention concerns a novel coupling and shimmy damper so connecting the wheels as normally to resist rotation relative to one another, but permitting relative rotation thereof as required for steering purposes.

In some aircraft the nosewheel strut does not have adequate torsional rigidity to absorb the damping torque developed by strut-mounted shimmy dampers. Therefore, even with a strut-mounted shimmy damper, shimmy, namely, relatively high frequency oscillations about the axis of the strut, sometimes persists.

An important object of the present invention is to provide a new shimmy damping device constructed and arranged to yieldably interconnect relatively rotatably mounted dual nosewheels and by which shimmy is prevented even where the strut and/or the fuselage structure is inadequate to absorb the normal damping torque produced by other forms of shimmy dampers.

Another object of the invention is to provide a novel damper of the character indicated which accords a minimum weight, efficient unit; and which is especially conveniently constructed for mounting or removal thereof in respect to the associated wheels.

A further object of the invention is to provide a novel damper structure of the character indicated having unique shear film coupling means.

Still another object of the invention is to provide a novel damper of the viscous shear film coupling type, especially adapted for the purposes indicated, having improved means for service over a wide temperature range.

Other objects, features and advantages of the present invention will be readily apparent from the following detailed description of a preferred embodiment thereof taken in conjunction with the accompanying drawings, in which:

FIGURE 3 is a side elevational view of one of the segmental viscous damper coupling disc members;

FIGURE 4 is an enlarged end elevational view of the disc segment taken substantially on the plane of line IV—IV of FIGURE 3;

FIGURE 5 is an enlarged fragmentary radial sectional detail view through the annular damper housing member carrying integral coupling discs; and FIGURE 6 is a slightly enlarged sectional elevational detail view taken substantially along the line VI—VI of FIGURE 1.

As shown on the drawings:

Figure 1:
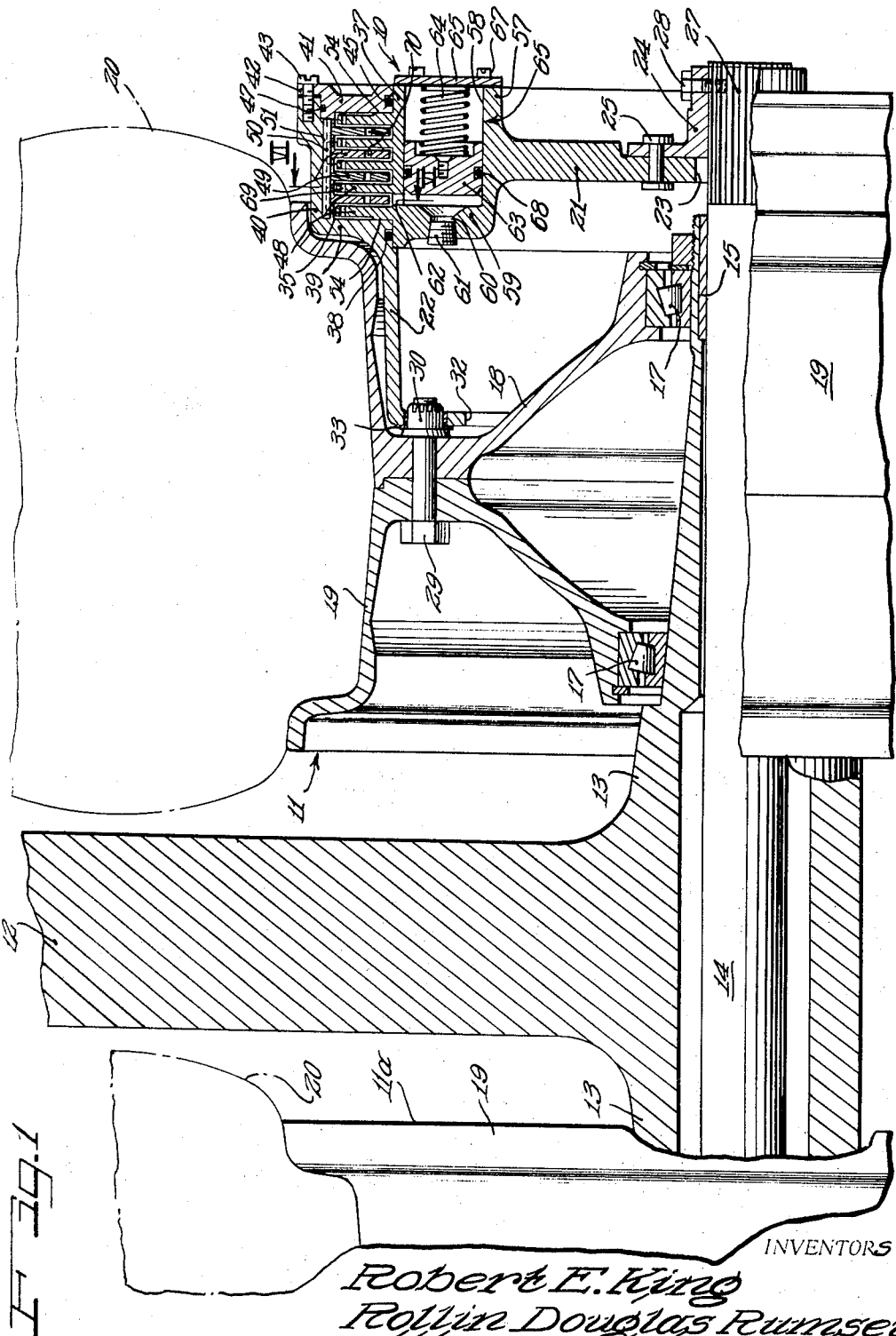
FIGURE 1 is a fragmentary vertical sectional detail view through an aircraft dual nosewheel assembly, embodying features of the present invention.

A damper 10 in accordance with the principles of the present invention is constructed and arranged to be operatively mounted in yieldably coupling relation to a pair of coaxially related but axially spaced wheels 11 and 11a of a dual nosewheel assembly including an operatively generally vertical strut 12 connected in any preferred manner to the fuselage of an aircraft, including a helicopter, and adapted for steering the aircraft on the ground. For this purpose, the strut 12 has coaxial, oppositely projecting hub portions 13 rotatably journaling a shaft 14 on bearings 15 and respectively supporting on their outer perimeters the wheels 11 and 11a on suitable bearings 17. Each of the wheels includes a wheel body 18 rotatable on the bearings 17 and having an outer peripheral tire rim 19 carrying a suitable pneumatic tire 20.

A problem, common to this type of nosewheel running gear, is that of tendency to shimmy, namely, to oscillate rapidly vibrationally about the axis of the strut 12 while running and resulting from any condition causing one of the wheels 11 or 11a to tend to overtravel or undertravel its companion, as, for example, unevenness in the surface over which the aircraft is traveling. Such causes of shimmy could, of course, be largely overcome by connecting the wheels 11 and 11a fixedly in co-rotative relation. However, that obviously creates a steering problem.

According to the principles of the present invention, the wheels 11 and 11a are yieldably coupled in a manner to resist relative rotation adequately to minimize tendency toward and to damp any tendency toward relative rotation of the wheels and thus effectively damp shimmy, while at the same time permitting intentional relative rotations of the wheels as demanded to facilitate steering. To this end, the wheel 11a is suitably attached in fixed co-rotational relation to one end of the shaft 14, which rotates freely within the hub 13 from which its opposite end portions project. Yieldable coupling of the wheel 11 with the shaft 14 is effected by means of the damper 10, and thereby with the wheel 11a which is co-rotatably attached to the shaft. In other words, the shaft 14 serves as a convenient coupling extension of the damper 10 through the hub structure 13 of the strut 12.

In a desirable construction, the damper 10 comprises two major housing components including a first generally radially extending flange member 21 constructed and arranged to be secured co-rotatably through the shaft 14 with the wheel 11a. A second major damper component comprises a generally axially extending complementary flange member 22 which is constructed and arranged to be attached co-rotatably with the wheel 11. Construction and relationship of the members 21 and 22 is such as to attain maximum damping constant in a minimum weight, efficient, economical damper unit which can be readily mounted or removed from the nosewheel gear without requiring jacking up of the aircraft or disassembly of the nosewheel gear in any way. For light weight, many of the parts of the damper are made from lightweight material such as cast aluminum.

In a practical manner of securing the damper member 21 to the shaft 14, it is provided with an axial clearance aperture 23 to pass the associated end portion of the shaft 14 therethrough and an annular, generally L-shaped cross-section steel adapter or coupling flange 24 has a radial flange secured as by means of a plurality of rivets 25 to the inner margin of the member 21. The axial body of the coupling flange 24 is internally splined for co-rotative keyed engagement with splines 27 on the shaft 14, with means such as a lock screw 28 securing the flange 24 against unintentional axial displacement.

Attachment of the damper member 22 to the wheel 11 is by having the axial annular body flange thereof of a diameter to lie closely adjacent to the inner side of the adjacent base flange of the tire rim 19 and providing means on the inner end of the flange member 22 to cooperate with means on the wheel body 18 such as attachment bolts or studs 29 and more particularly nuts 30 on the outer ends thereof. For this purpose, the inner end of the flange member 22 has on a narrow radially inwardly extending annular reinforcing flange 31 respective ear flange extensions 32 through which the stud heads or nuts 30 are received (FIGS. 1 and 2), with tubular steel inserts or bushings 33 effecting a well-fitting and wear-resisting liner between the ear surfaces and the engaged co-rotationally retaining elements 30. Since through this arrangement one of the members 21 and 22, and in this instance the member 21, is necessarily disposed in the way of access to the attaching means for the member 22, such member is provided with at least one opening 34 of ample size to enable access to the attaching means for the member 22. In this instance the member 21 is preferably constructed in spoked form, having a plurality, herein four, of the openings 34 with an equal number of intervening, equally spaced spokes radiating from a central continuous portion of the member.

In order to attain maximum damping efficiency within the limited diameter and depth of the space available, the damper 10 is desirably constructed of a maximum diameter which accommodates it within the outturned terminal flange of the tire rim 19 so that yieldable coupling means carried by and between the members will be afforded maximum circumferential area for efficient operation within a minimum envelope or housing. In preferred form, the coupling means is of the shear film type utilizing the resistance to shear of a viscous damping fluid such as silicone of suitable viscosity and capable of efficient functioning within a large temperature range. For example, for the purpose indicated silicone of about 60,000 centistokes operable efficiently within a temperature range of between about minus 65° F. to about 160° F. has been found suitable for this damper. This coupling, damping fluid is contained within an annular housing 35 within which each of the damper members 21 and 22 has a plurality of working surfaces co-rotated therewith and disposed in complementary shear film spaced relation, having regard to the viscosity of the damping fluid, to the opposed working surfaces of the other of the members. In one desirable form the housing defining the working chamber 35 comprises an axially extending annular outer perimeter flange 37 on the damper member 21 having its inner margin in slidable joint relation to the inner side of the outer margin of the body flange of the damper member 22, with a sealing ring 38 engaged in the joint. Extending generally radially from such joint, the member 22 has a housing flange 39 extending in spaced complementary relation within the terminal flange of the tire rim and joining an axially outwardly extending annular housing flange 40 complementary to and spaced from the housing flange 37. A closure for the outer side of the chamber 35 is provided by an annular cover 41 telescoped within the outer margins of the flanges 37 and 40 and secured fixedly by means of a radially outwardly extending attachment flange 42 to the flange 40 as by means of screws 43 held against loosening by restraining wires 44. Respective sealing rings 45 and 47 are mounted in the joints between the housing flanges 37 and 40 and the closure disc ring 41.

Within the working chamber 35, one of the damper members 21 or 22, in this instance the member 21, has at least a pair of continuous annular ring discs 48, in this instance five, projecting into the working chamber and provided with opposed spaced working faces. By preference, the continuous discs 48 are formed integral in one piece with the housing flange 37 of the member 21. This affords the advantage of maintained accuracy of spacing within close tolerances.

Interleaved within the spaces between the coupling ring discs 48 are coupling ring disc means comprising respective sets of a respective plurality, herein two, of segmental disc members 49 disposed in circumferentially aligned relation and each having oppositely facing working surfaces in shear film spaced relation to the working faces of the discs 48. To secure the disc segments 49 co-rotatively to the damper member 22, and in reasonably accurately shear film spaced relation to the discs 48, each of the disc segments 49 (FIGS. 1 and 3) is formed with an outer periphery fitting closely slidably within the annular chamber surface provided by the flange 40. Keying means conveniently in the form of a dowel pin 50 extends into a semicylindrical longitudinally extending keying groove 51 in the chamber surface of the wall 40 and complementary aligned keying grooves 52 in the outer perimeters of the respective disc segments 49 in each half of the sets of segments (FIG. 6). To maintain proper shear film spacing of the segmental disc assemblies 49 relative to the discs 48, each of the disc segments 49 is provided with outer marginal oppositely extending spacer shoulders 53 (FIG. 4) which on axially contiguous sets of the segmental discs abut to maintain the spacing, and on the innermost and outermost sets of the segmental discs abut opposing shoulders provided for this purpose on the housing flange 39 and on the cover 41.

Figure 2:
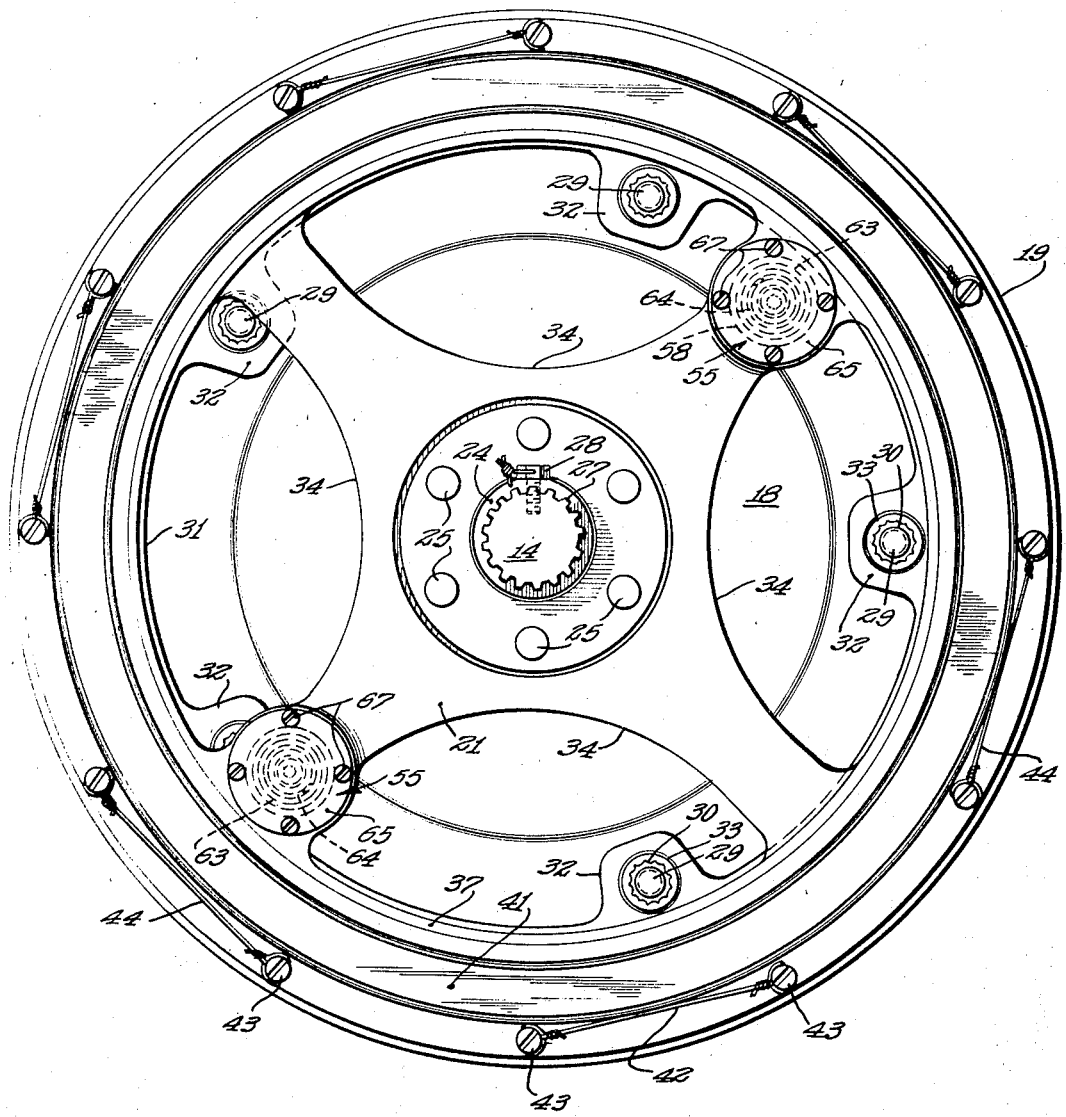
FIGURE 2 is a side elevational view of the wheel of FIGURE 1 with which the novel shimmy damper is associated.

In addition to the coupling shear film of viscous fluid between each of the opposed axially facing working faces and surfaces of the interleaved discs 48 and 49, the roots of the grooves defined between the discs 48 on the housing flange 37 are of annular generally cylindrical form, and the roots of the grooves defined between the discs 49 by the abutting shoulders 53, as well as such shoulders and the opposing shoulders on the flanges 39 and 41 are of annular generally cylindrical form, while the respective opposing edges of the discs are of complementary generally cylindrical form and in the shear film spaced relation maintained between the axially facing working faces and surfaces, whereby the aggregate shear film area is significantly increased. In addition, a shear film spaced relationship is maintained between the endmost of the discs 48 and the opposing housing surfaces afforded by the flange 39 and the cover 41. For this purpose spacers 54 are provided, desirably as integral axial projections from the base margins of the outermost working face of each of the outermost of the discs 48 (FIGS. 1 and 5). Axial play is minimized and substantially uniform shear film thickness of the silicone fluid between all of the working surfaces and avoidance of any metal-to-metal rubbing of any of the working surfaces or faces against each other assures optimum damping with avoidance of breakdown in the fluid, since the shear rates are maintained as close to equal throughout the structure as possible. These factors taken together with the maximum use of opposed working surfaces and faces within the working chamber attains high efficiency within minimum occupied space for the damper.

Inasmuch as the damper 10 is required to operate over a wide temperature range, and in view of the fact that during even most of its operating period at any given time the members 21 and 22 of the damper will not be required to rotate relatively, but will rotate jointly with the wheels, means are provided for fluid thermal expansion and contraction while maintaining the shear film gaps filled at all times. To this end, a filled, air-free system is provided by means of spring-loaded, fluid-replenishing and expansion reservoir means. To promote uniformity in operation and to facilitate filling the working chamber 35 while excluding air therefrom and purging the same of any air initially therein, a pair of expansion and replenishing reservoirs 55 (FIGS. 1 and 2) is provided disposed in balanced diametrically spaced relation on the damper member 21 along the radially inner side of and communicating through the housing flange 37 with the working chamber 35. For this purpose, two of the diametrically aligned spoke portions of the member 21 are provided in integral and contiguous relation to the flange 37 with substantial respective reservoir chamber embossments (FIGS. 1, 2 and 5) 57 projecting axially to substantially the same width as the flange 37, and each provided with a cylindrical chamber 58 which normally opens toward the axially outer side of the member 21. At its axially inner end each of the chambers 58 is closed by wall 59 provided with a filler opening 60 which, in the liquid-filled condition of the damper is closed by a suitable threaded plug 61. For communication with the working chamber 35, a port 62 opens through the flange 37 between the inner or base end of the reservoir chamber 58 and the space between the adjacent two working face discs 48.

Within each of the reservoirs 55 means are provided for maintaining viscous damping fluid in the chamber 58 continuously under pressure toward the base wall 59 and thus through the port 62 in the working chamber 35. To this end, a pressure plunger or piston 63 is slidably mounted in complemental relation in the cylindrical chamber 58 and is normally biased toward the base wall 59 by means conveniently comprising a coiled compression spring 64 which thrusts at its inner end against the piston and seats at its opposite end against a cover plate 65 secured as by means of screws 67 in closing relation to the outer end of the chamber 58. A sealing ring 68 mounted in the perimeter of the piston 63 prevents leakage thereby. Pressure of the piston 63 against the viscous coupling fluid in the reservoir 58, in each instance, thereby maintains the working chamber 35 filled with the coupling fluid, whereby the shear films of the fluid are maintained in continuous operative relation to the coacting working faces and surfaces, and in spite of any volumetric variations in the damping fluid resulting from temperature fluctuations.

To facilitate equalized distribution of the damping fluid within the working chamber 35 wherein most of the volume is occupied by the interleaved damper discs 48 and 49, each of the discs 48 is provided adjacent to its edge with a circumferentially spaced series of small distribution openings 69 extending axially therethrough (FIGS. 1, 5 and 6). For the same purpose, the segmental discs 49 are provided with distribution openings 70 extending axially therethrough spaced radially inwardly relative to the openings 69. The number, size and circumferential spacing of each of the annular series of distribution openings 69 and 70 may be chosen in relation to the particular dimensional proportions, the viscosity of the damping fluid, service requirements, and the like.

From the foregoing, it will be appreciated that the wheel coupling damper 10 is constructed and arranged to be fully bench-assembled and loaded with the viscous damping liquid fluid and is then mountable and removable in respect to the wheel with which to be associated by simple axially inward mounting maneuver and affixation in respect to the wheel assembly, with all attaching and securing means fully and easily accessible from the axially outer side of the wheel. Removal of the damper unit at any time is just as easily enabled by simple reversal of the assembly maneuver. All this can be accomplished without disturbing the dual nosewheel assembly in any respect and while the nosewheel assembly is otherwise fully operational, namely, without removal of the associated wheel or disassembly of any part thereof, without any requirement to jack up the wheel assembly or the aircraft with which associated, and with the damper 10 fully assembled and loaded for operation.

In filling the damper 10 with damping fluid all air can be effectively purged from the working chamber 35 by introducing the charge or load of damping fluid under pressure through one of the reservoir charging openings 60 while the other of said openings is at least partially open for escape of air displaced by the entering liquid. By having the opening 60, which serves as an air escape or vent opening, directed upwardly and its associated reservoir tilted upwardly relative to the reservoir 55 through which filling is taking place, quite effective and substantially complete purging of air from the system is accomplished during filling. This is advantageous not only in that it assures full effectiveness of coupling viscous shear films within the working chamber, but also by avoiding tendency toward oxidation of the damping fluid whereby damper life, as well as continuous uniform damping action are assured.

We claim as our invention:

1. In a yieldable coupling and shimmy damper for an aircraft dual nosewheel steering gear assembly which includes a generally vertically operative strut rotatably supporting a pair of spaced-apart relatively rotatable running wheels at least one of which has a generally radially extending beyond a tire rim supported thereby with fasteners having portions thereof projecting toward an outer side of the body adjacent to the tire rim, said one wheel being mounted to be normally rotatable relative to the other of said wheels and a shaft extending corotatively from said other wheel through said one wheel and having an end portion projecting outwardly relative to said one wheel:

the damper comprising a first generally annular damper member having emans for engaging it corotatively onto said outwardly projecting portion of said shaft by an axially inward movement;

means for securing said engaging means of said first member fixedly and corotatively onto said shaft portion;

a second annular damper member complementary to said first member;

yieldable coupling means carried by and between said damper members normally resisting relative rotation between the members; and means on said second member engageable with said projecting portions of said fasteners as an incident to moving said first member onto said shaft portion and thereby retaining said second member corotative with said one wheel;

whereby said damper is adapted to be constructed as a complete unit and to be mounted and removed relative to said first wheel without disturbing said first wheel or said fasteners.

2. A damper according to claim 1, in which said means on said second damper member comprises an axially extending flange having radially extending flange means in which said projecting portions of the fasteners are received.

3. A damper according to claim 2, in which said fasteners are bolts and the projecting portions of the bolts have nuts which are engaged in said radially extending flange means.

4. A damper according to claim 3, comprising bushing sleeves engaged about said nuts and engaged by said flange means.

5. A damper according to claim 1, in which said first damper member has generally radially extending spokes with openings therebetween through which said means on said second damper member and said projecting portions of the fasteners engaged thereby are observable and accessible from the outer side of the damper.

6. A damper according to claim 1, said damper members defining a chamber therebetween about the outer perimeter of said first member, and said coupling means comprising respective sets of radially extending interleaved disks with viscous damping fluid filling said chamber and providing viscous coupling damping films between said disks and at least certain of said spokes having pressurized fluid replenishing reservoir means communicating with said chamber.

7. In combination in an aircraft dual nosewheel steering gear assembly including a generally vertically operative strut, a pair of spaced-apart relatively rotatable running wheels supported by said strut assembly, one of said wheels having a generally radially extending body and a tire rim supported thereby, said one wheel comprising separable parts secured together with fasteners having portions thereof projecting toward an outerside of the body adjacent to the tire rim, means on the strut rotatably mounting said one wheel relative to the other of said wheels, and a shaft extending corotatively from said other wheel through said one wheel and having an end portion projecting outwardly relative to said one wheel; a damper comprising a first generally annular damper member having means engaging said outwardly projecting shaft portion and being adapted to be assembled and removed by an axial maneuver; means securing said engaging means of said first member fixed and corotatively onto said shaft portion; a second annular damper member complementary to said first member; yieldable coupling means carried by and between said damper members normally resisting relative rotation between said members; and means on said second member engaged with said projecting portions of said fasteners and being engageable therewith and removable relative thereto as an incident to said axial maneuvering of said first member and in said engagement with said projecting portions retaining said second member corotative with said one wheel; whereby said damper resists relative rotation of said wheels but permits the relative rotation by yielding of said coupling means.

8. A combination according to claim 7, said means for securing said first member comprising an axially extending flange telescopically related to said tire rim between the tire rim and the said fasteners and having radially inwardly extending flange means engaging the fasteners.

9. A combination according to claim 8, said fasteners comprising bolts and the projecting portions of the bolts having nuts which are engaged by and in said radially extending flange means.

10. A combination according to claim 9, comprising wear-resistant bushings interposed between said nuts and said flange means.

11. A combination according to claim 7, said first damper member having generally radially extending spokes with substantial openings therebetween through which said means on said second damper member and said projecting portions of the fasteners engaged thereby are observable and accessible from the outer side of the damper.

12. A shimmy damper for aircraft duel nosewheels comprising; a coupling flange engageable in axially slidable relation with an outer end portion of a shaft corotative with one wheel and extending through and outwardly beyond a second wheel mounted to rotate relative to said shaft; means for securing said flange fixedly and corotatively on the shaft end portion; an annular first damper member of substantially greater diameter than said flange and having a plurality of generally radial spokes fixedly connected to said flange and defining substantial openings therebetween; an annular second damper member mounted on said first damper member in relatively rotatable relation; said damper members defining therebetween an annular damper chamber; respective sets of interleaved generally radially extending coupling disks; viscous coupling fluid filling said chamber and coupling said disks yieldably; replenishing chamber means on at least one of said spokes communicating with said chamber to maintain the chamber filled with the viscous damping fluid; an axially inwardly extending flange on said second damper member; radially inwardly extending flange means on said axially extending flange having openings therein for engagement with outwardly projecting portions of fasteners on said second wheel and thereby to couple said second damper member rotatively with said second wheel, said openings enabling ready unilinear engagement of said coupling flange and said flange means with respectively said shaft portion and said fastener portions.

References Cited

UNITED STATES PATENTS

| 2,252,163 | 8/1941 | Burger. |
| 2,620,235 | 12/1952 | Butler. |
| 2,661,917 | 12/1953 | O'Connor et al. ____ 188—90 XR |
| 2,743,792 | 5/1956 | Ransom _____ 188—90 |
| 3,119,469 | 1/1964 | Farr et al. _____ 244—103 XR |
| 3,133,717 | 5/1964 | Hartel _____ 244—103 |

FOREIGN PATENTS

| 624,762 | 8/1961 | Canada. |
| 708,545 | 5/1954 | Great Britain. |

MILTON BUCHLER, *Primary Examiner.*

P. E. SAUBERER, *Assistant Examiner.*

U.S. Cl. X.R.

244—50; 188—90, 1

PO-1050
(5/69)

UNITED STATES PATENT OFFICE
CERTIFICATE OF CORRECTION

Patent No. 3,424,406  Dated January 28, 1969

Inventor(s) ROLLIN DOUGLAS RUMSEY and ROBERT E. KING

It is certified that error appears in the above-identified patent and that said Letters Patent are hereby corrected as shown below:

Column 1, line 18, "wheels and has yieldably coupled therewith a second" should read --first damper member on the shaft is engaged with--. Column 6, line 16, "beyond" should read --body and--. Column 6, line 24, "emans" should read --means--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents